(12) United States Patent
Soudier

(10) Patent No.: US 9,604,882 B2
(45) Date of Patent: Mar. 28, 2017

(54) SPINEL FORMING REFRACTORY COMPOSITIONS, THEIR METHOD OF PRODUCTION AND USE THEREOF

(71) Applicant: CALDERYS FRANCE, Issy-les-Moulineaux (FR)

(72) Inventor: Jerome Soudier, Vaux en Bugey (FR)

(73) Assignee: Calderys France, Issy-les-Moulineaux (FR)

( * ) Notice: Subject to any disclaimer, the term of this patent is extended or adjusted under 35 U.S.C. 154(b) by 0 days.

(21) Appl. No.: 14/890,756

(22) PCT Filed: May 12, 2014

(86) PCT No.: PCT/EP2014/059666
§ 371 (c)(1),
(2) Date: Nov. 12, 2015

(87) PCT Pub. No.: WO2014/184145
PCT Pub. Date: Nov. 20, 2014

(65) Prior Publication Data
US 2016/0122249 A1    May 5, 2016

(30) Foreign Application Priority Data
May 13, 2013 (EP) ..................................... 13290106

(51) Int. Cl.
| | | |
|---|---|---|
| C04B 35/03 | (2006.01) | |
| C04B 35/10 | (2006.01) | |
| C04B 35/443 | (2006.01) | |
| C04B 35/626 | (2006.01) | |
| C04B 35/628 | (2006.01) | |
| C04B 35/634 | (2006.01) | |
| C04B 35/66 | (2006.01) | |
| F27D 1/00 | (2006.01) | |
| F27D 1/10 | (2006.01) | |

(52) U.S. Cl.
CPC ............ *C04B 35/10* (2013.01); *C04B 35/443* (2013.01); *C04B 35/6281* (2013.01); *C04B 35/62665* (2013.01); *C04B 35/62813* (2013.01); *C04B 35/63452* (2013.01); *C04B 35/63476* (2013.01); *C04B 35/63488* (2013.01); *C04B 35/66* (2013.01); *F27D 1/0006* (2013.01); *F27D 1/10* (2013.01); *C04B 2235/3206* (2013.01); *C04B 2235/3217* (2013.01); *C04B 2235/5427* (2013.01); *C04B 2235/5436* (2013.01); *C04B 2235/5463* (2013.01); *C04B 2235/5472* (2013.01)

(58) Field of Classification Search
CPC .......... C04B 35/443; C04B 2235/3222; C04B 41/5046
USPC ........................ 501/118, 119, 120, 121, 125
See application file for complete search history.

(56) References Cited

U.S. PATENT DOCUMENTS

| | | | | |
|---|---|---|---|---|
| 5,573,987 A | * | 11/1996 | Harmuth ............... | C04B 35/043 501/104 |
| 7,166,551 B2 | * | 1/2007 | Kaneshige ............ | C04B 35/443 501/120 |
| 7,762,475 B2 | * | 7/2010 | Ohata ................... | B01F 5/0646 239/407 |
| 2005/0255986 A1 | | 11/2005 | Kaneshige et al. | |
| 2012/0058881 A1 | | 3/2012 | Suren et al. | |
| 2013/0090230 A1 | | 4/2013 | Champion et al. | |

FOREIGN PATENT DOCUMENTS

| | | |
|---|---|---|
| CN | 1420100 A | 5/2003 |
| CN | 101555153 A | 10/2009 |
| JP | S 63 248716 A | 10/1988 |

OTHER PUBLICATIONS

Bier, Thomas A.; Parr, Christopher; Revais, Catherine; Vialie, Michel; and Lafarge Aluminates, "Spinel Forming Castables: Physical and Chemical Mechanisms During Drying", 2000, retrieved from the internet: URL:http://www.ranews.info/feat art/2000/fano00a.pdf—XP055083098.

"Superground low soda alumina", 2013, retrieved from the Internet: URL:http://alteo-alumina.com/en/product line/superground-low-soda-alumina—XP055083115.

Soudier, Jérôme, "Understanding and Optimisation of MgO Hydration Resistance and Spinel Formation Mechanisms for Increasing Performances of DVM Used in Crucible Induction Furnaces Melting Steel," UNITECR '05, Proceedings of the Unified International Technical Conference on Refractories: 9$^{th}$ Biennial Worldwide Congress on Refractories, American Ceramic Society, U.S., 2005, pp. 679-683—XP008165263.

Braulio, M.A.L.; Bittencourt, L.R.M., and Pandolfelli, V.C., "Magnesia grain size effect on in situ spinel refractory castables", Journal of the European Ceramic Society, vol. 28, No. 5, 2008, pp. 2845-2852—XP024100143.

International Search Report and Written Opinion issued Dec. 8, 2014, in International Application No. PCT/EP2014/059666.

* cited by examiner

*Primary Examiner* — Noah Wiese
(74) *Attorney, Agent, or Firm* — Finnegan, Henderson, Farabow, Garrett & Dunner LLP

(57) ABSTRACT

A particulate composition for use in alumina-magnesia spinel forming dry vibratable mixtures may include, based on the total weight of the particulate composition, from 95 to 99.9 wt % of a mixture of particulate $Al_2O_3$ and particulate MgO, and from 0.1 to 5 wt % binding agent, wherein at least a portion of the particles of said mixture of particulate $Al_2O_3$ and particulate MgO is present in the particulate composition as a coating of particles on the surface of other particles. Methods of producing and using the particulate composition are also described.

19 Claims, No Drawings

SPINEL FORMING REFRACTORY COMPOSITIONS, THEIR METHOD OF PRODUCTION AND USE THEREOF

CLAIM FOR PRIORITY

This application is a U.S. national phase entry under 35 U.S.C. §371 from PCT International Application No. PCT/EP2014/059666, filed May 12, 2014, which claims the benefit of priority of European Patent Application No. 13290106.7, filed May 13, 2013, the subject matter of both of which is incorporated herein by reference.

FIELD OF THE INVENTION

The present invention relates to particulate compositions intended for use in the formation of spinel containing monolithic refractory compositions, for example as refractory linings for metallurgical ladles. The invention further relates to a method of formation of such particulate compositions and their use in the formation of monolithic refractory compositions.

BACKGROUND OF THE INVENTION

Refractories are materials having properties that make them suitable for use as heat-resistant barriers in high temperature applications. Unshaped refractory materials have the ability to form joint-less linings and are often referred to as monolithics. These materials are useful for example as linings for cupola hearths and siphons, blast furnaces, main, secondary and tilting runners, and more generally vessels or vessel spouts, ladles, tundishes, reaction chambers and troughs that contain, direct the flow of, or are suitable for facilitating industrial treatment of liquid metals and slags, or of any other high temperature liquids, solids or gases.

Dry vibratable mixes (DVM) generally consist of a dry mix of aggregated particles (aggregate size up to 15 mm) and powdered particles (particle size below 100 μm). Spinel forming DVMs consist of alumina rich aggregates (such as white fused alumina; WFA) and fine MgO-powder. DVMs are installed in their final position of use and compacted manually, mechanically, or most commonly by vibration. Refractory linings resulting from such compaction of a DVM are then heated to their final service temperature, which results in a ceramic transformation (sintering, creation of new phases) within the composition. In the case of refractory linings, a gradient of physical properties exists within the linings themselves, caused by a temperature gradient during the firing step, as the lining is typically fired by introduction of molten metal into a recipient covered by the lining, and the lining is therefore only heated by thermal conduction from one (internal) side.

For DVMs, this often leads to a structure of a refractory lining wherein the internal (more strongly heated) portion of the lining is strongly sintered, wherein the more externally located portions are less strongly sintered. Such a gradient of mechanical properties for example prevents cracks, often caused by mechanical or thermal shock on the internal surface of a lining, from propagating through the entire width of the lining. Liquid metal or slag could migrate through the lining by following the volume opened by a crack. Providing a refractory lining which has reduced risk of cracking presents an considerable safety improvement for the hardware lined with dry vibratable mixes.

Spinel forming DVMs, such as alumina-magnesia spinel forming DVMs, are commonly used for forming monolithic refractory linings, since they offer additional advantages in terms of lining performance and service duration. Additional improvement results from the ability of alumina-magnesia spinels to trap iron oxides present in slag within their crystal lattice, thus efficiently preventing slag penetration within the lining and reducing wear by chemical reaction between the refractory and the slag. An additional advantage of the spinel forming DVM is that a volume increase occurs during spinel formation, since the density of spinel is lower than that of powdered alumina and magnesia. This volume increase helps compensate for sintering shrinkage and, depending on quantity of spinel formed, results in further densification, i.e. reduction of porosity in the refractory lining, since volume expansion must be accommodated within the refractory microstructure as the lining operates in a volume-restricted environment.

Therefore, it is commonly accepted in the art that overall performance of a refractory lining is directly linked to the quantity of spinel formed during heating up and operation of the refractory DVM spinal.

Spinel forming DVMs according to the state of the art comprise fine alumina powder (particle diameter <0.1 mm), fine MgO powder (particle diameter <0.1 mm) and coarse alumina grains and aggregates (0.1 mm<particle diameter <15 mm). A particular ratio between the powder and aggregate fractions must exist, so that the product can be installed and compacted in the intended space. If the fraction of fine powders becomes too high, a DVM cannot be installed efficiently. Spinel forming DVMs according to the state of the art therefore have an MgO content no higher than 15 wt.-%. However, the stoechiometric ratio for forming alumina-magnesia spinel is 71.8 wt.-% $Al_2O_3$ to 28.2 wt.-% MgO.

SHORT DESCRIPTION OF THE INVENTION

The present invention is defined in the appended claims.

In particular, the present invention is embodied by a particulate composition for use in an alumina-magnesia spinel forming dry vibratable mix (DVM), the composition comprising, based on the total weight of the particulate composition, from 95 to 99.9 wt.-% of a mixture of particulate $Al_2O_3$ and particulate MgO, and from 0.1 to 5 wt.-% binding agent, wherein at least a portion of said mixture of particulate MgO and particulate $Al_2O_3$ is present in the particulate composition as a coating of particles on the surface of other particles. For example, in one embodiment, the total amount of the mixture of particulate $Al_2O_3$ and particulate MgO may be from 98 to 99.5 wt.-% and the total amount of binding agent from 0.5 to 2 wt.-%.

In one embodiment of the present invention, the composition for use as an alumina-magnesia spinel forming DVM has a particle size distribution, such that 35 to 65 wt.-%, preferably 40 to 60 wt.-%, of the particulate composition are particles having a particle size of 1 mm or above, 45 to 75 wt.-%, preferably 50 to 70 wt.-%, of the total provided particulate composition are particles having a particle size of 0.5 mm or above, 65 to 95 wt.-%, preferably 70 to 90 wt.-%, of the total provided particulate composition, such as for example 2 wt.-% or more, or for example 5 wt.-% or more, are particles having a particle size of 0.045 mm or above, the balance being made up of binding agent, wherein at least a portion of the particulate composition are first metal oxide particles selected from $Al_2O_3$, MgO or both and having a particle diameter of 0.25 mm or below, which are present in the particulate composition as part of a coating on second metal oxide particles selected from $Al_2O_3$ and MgO and having a particle diameter of 0.5 mm or above.

In one embodiment, at least a portion of the particulate composition, such as for example 2 wt.-% or more, or for example 5 wt.-% or more, are first metal oxide particles selected from $Al_2O_3$, MgO or both and having a particle diameter of 0.045 mm or below, which are present in the particulate composition as part of a coating on second metal oxide particles selected from $Al_2O_3$ and MgO and having a particle diameter of 1 mm or above. In one embodiment, 55 to 85 wt.-% of the total provided particulate composition are particles having a particle size of 0.25 mm or above, or 60 to 90 wt.-% of the total provided particulate composition are particles may have a particle size of 0.1 mm or above.

In one embodiment of the present invention, 50 wt.-% or more, such as for example 90 wt.-% or more, such as for example substantially all of the particles having a particle diameter of 0.25 mm or below are present as part of a coating of metal oxide particles on the surface of particles having a particle diameter of 0.5 mm or above, or 50 wt.-% or more, such as for example 90 wt.-% or more, such as for example substantially all of the particles having a particle diameter of 0.045 mm or below are present as part of a coating of metal oxide particles on the surface of particles having a particle diameter of 1.0 mm or above.

In one embodiment of the invention, some of the particles, such as 30 wt.-%, or 50 wt.-% or 90 wt.-%, or substantially all the particles having a particle size of 0.25 mm or below are particles having a particle diameter of 0.045 mm or below.

In one embodiment of the invention, the first metal oxide particles are $Al_2O_3$ or a mixture of $Al_2O_3$ and MgO and the second metal oxide particles are MgO. In one embodiment of the invention, the first metal oxide particles are MgO or a mixture of MgO and $Al_2O_3$ and the second metal oxide particles are $Al_2O_3$.

According to one aspect of the present invention, the binding agent comprised in the particulate composition is selected from a thermoplastic polymer, a thermosetting polymer and a two-component polymerisation binding agent. According to one aspect of the present invention, the $Al_2O_3$ particles present in the particulate composition are white fused alumina (WFA) particles and aggregates.

According to the present invention, a binding agent is added to the particulate composition in order to form aggregates in the composition, the aggregates comprising a core of the second metal oxide particles and having a coating comprising first metal oxide particles.

According to one aspect of the present invention, the particulate composition may further comprise mineraliser particles as part of a coating, wherein the mineraliser particles are selected from the group consisting of $B_2O_3$, $V_2O_5$, $TiO_2$, $Y_2O_3$, $Fe_2O_3$, CaO, NaCl, $AlCl_3$, MgCl, LiF, $ZnF_2$, $BaF_2$, $CaF_2$.

According to one aspect of the present invention, the particulate composition may further comprise one or more drying agents, such as for example anhydrous magnesium sulphate ($MgSO_4$), boron oxide ($B_2O_3$), amorphous silica gel ($SiO_2$), xanthan gum, acrylic or metacrylic acids.

Also part of the present invention is a method of producing a particulate composition for use in an alumina-magnesia spinel forming dry vibratable mix, comprising the steps of mixing the particulate materials and binding agent in the required amounts in a mixer.

Also part of the present invention is the use of the particulate compositions according to one aspect of the present invention in the provision of a DVM for the production of monolithic refractory products, such as monolithic refractory linings for metallurgical ladles.

It is understood that the following description and references to the figures concern exemplary embodiments of the present invention and shall not be limiting the scope of the claims.

DETAILED DESCRIPTION OF THE INVENTION

As described in the present disclosure, any particles described as forming part of a particle composition may be present in said particle composition in the shape of free flowing particles, or as forming part of an aggregate of particles, such as part of a coating on another particle.

The present invention according to the appended claims provides particulate compositions for use in dry vibratable mixtures to form alumina-magnesia spinel containing refractory compositions, such as refractory monolithics for use as linings in metallurgical ladles. The particulate compositions according to the present invention may form DVMs in their own right, or they may be part of a DVM comprising further constituents.

DVMs are used in the formation of refractory linings in industrial applications, such as in metallurgical ladles (coreless induction furnaces) for melting and/or holding metals. Commonly, the DVM is installed along the inner walls of a metallurgical ladle, compacted mechanically, for example by using a mechanical vibrating tool. The compacted DVM is sufficiently stable for forming a green ceramic lining, which is subsequently sintered during use of the ladle, i.e. by introduction of, for example, molten iron or steel at a temperature of 1600° C. or higher. The sintering of the ceramic lining in order to form the sintered refractory lining may therefore be carried out during normal operation of the ladle.

The use and formation of spinels in refractory linings is limited in practice by several practical constraints:

In order for a DVM to be suitable for the formation of a refractory composition, the density of the compacted dry mix must be as high as possible. In other words, the compactness of the mix must be high and intergranular porosity low. Achieving a high compactness after compaction or vibration requires an optimised particle size distribution of the DVM, including obtaining a correct balance between fine or ultra-fine powders and larger aggregates. However, the total volume of fine powders needs to be limited, since an excessive proportion of particles having a particle diameter of 0.1 mm or below renders placing and compacting of the DVM very long and inefficient.

In order to obtain a monolithic refractory lining having good thermal cycling resistance after compacting and heating/sintering of the spinel forming DVM, the MgO particles used may not be too coarse. MgO has a higher thermal expansion coefficient than $Al_2O_3$, and upon heating the presence of larger MgO particles in the DVM would cause cracks to form around larger magnesia grains that expand and generate stresses in the surrounding refractory microstructure, which it cannot accommodate.

The presence of free unreacted MgO particles in the fired/sintered refractory lining is detrimental (a) due to their thermal properties mentioned above, but (b) also because free magnesia is easily chemically attacked by slags, in particular silica containing slags, compared to free $Al_2O_3$ or spinel. It is therefore advantageous that on one hand, the proportion of MgO in the particulate composition is not excessive (which would lead to unreacted MgO being present in the fired product), and on the other hand that spinel formation occurs at lowest temperature and as quickly as possible during the start of the firing/sintering operation of the metallurgical hardware lined with spinel forming DVM, before any unreacted particulate MgO can be attacked by slag.

Finally, MgO has a strong affinity to water, in liquid or gaseous form, and reacts with water to form brucite. The MgO present in a spinel forming DVM may undergo hydration before installation of the DVM, or during service. The presence of hydrated MgO has a strong detrimental impact on the final performance of the DVM. If hydration occurs before installation, the flaky structure of magnesia hydrate crystals formed around hydrated magnesia particles can form lumps in the DVM, making installation impossible, or to a lower extend reduce the level of compactness reached after compaction or vibration. If hydration of MgO occurs after installation of the DVM, this can result in cracking of the lining, since the transformation of MgO into brucite takes place with a high volume expansion. Furthermore, transformation of MgO into brucite also causes a strong increase in the specific surface area of magnesia particles, which can affect spinel formation kinetics, which can thus become too rapid or brutal, resulting in cracking of the lining during spinel formation.

For these reasons, conventional DVM formulations for alumina-magnesia spinel formation are alumina based mixes comprising about 15 wt.-% MgO having a particle size distribution such that all the MgO particles have a diameter of 2 mm or less. However, the stoechiometric ratio for forming alumina-magnesia spinel is 71.8 wt.-% $Al_2O_3$ to 28.2 wt.-% MgO.

According to the present invention, it is possible to provide particulate compositions for use as an alumina-magnesia spinel forming DVMs having a stoechiometric or near-stoechiometric ratio of $Al_2O_3$ to MgO, hence making it possible to form refractory monolithic having a higher spinel content than the state of the art.

In the particulate compositions according to the present invention, at least a portion of the fine particles are present as part of coatings on the surface of coarser particles and aggregates. For example, at least a portion of the MgO and $Al_2O_3$ fine particles are present as part of coatings on the surface of coarser $Al_2O_3$ particles and aggregates This solves the problem of too many "free" small particles present in the DVM, which would render installation and compaction inefficient. In fact, according to the present invention, it is rendered possible to include larger amounts of fine particles in alumina-magnesia spinel forming DVMs without suffering the conventional detrimental effects of overall particle size distribution of the DVMs as a whole.

Furthermore, the fine MgO particles, normally prone to hydration due to their high specific surface areas, when they are part of coatings they are partially or entirely covered by the binding agent and may no longer react as easily with water from the air to form brucite, therefore rendering the DVMs according to the present invention more durable and reliable, improving storage capacity, making easier the production, handling and transport of the materials and therefore reducing the overall cost of forming alumina-magnesia spinel refractories.

The presence of fine MgO and/or $Al_2O_3$ particles as part of coatings on the surface of coarse $Al_2O_3$ and/or MgO particles also brings the particles in close contact before spinel formation occurs, therefore promoting the spinel forming reaction upon heating. Improved efficiency of the heating/sintering step in the formation of the final alumina-magnesia refractory product is thus achieved in the case of coarse $Al_2O_3$-particles coated with fine MgO and $Al_2O_3$-particles. It furthermore renders possible and safe the use of coarse MgO particles, which was considered so far not possible due to the unfavourable kinetics of the spinel forming reaction and the risk of reaction between unreacted MgO particles with slag. In fact, the overall kinetics of the spinel forming reaction is improved according to the present invention, on the one hand because of the close contact created between the coarse MgO-particles and the finer particles, and on the other hand because of a faster formation of spinel during the sintering step, effectively shielding coarse MgO-particles in the refractory lining even early on during the sintering process from slag, therefore preventing contact between MgO-particles and slag. In the case of refractory linings for metallurgical ladles, the formation of the desired spinel phase upon introduction of molten metal is accelerated, therefore reducing the risk of slag reacting with MgO particles prior to formation of the finished product.

The $Al_2O_3$-particles as disclosed herein can be any type of alumina known to the skilled person to be suitable in spinel formation. In one embodiment, the $Al_2O_3$-particles to be coated selected from alumina cement clinker/calcium aluminate aggregates having at least 60 wt.-% alumina, and/or aluminasilicate particles having at least 70 wt.-% alumina.

A wide range of binding agents known to the skilled person in the art may be used according to the present invention. The binding agent may be selected from solid thermoplastic binding agents, thermohardening (thermo setting) binding agents and liquid, optionally multi-component, reacting binding agents. The binding agent may, for example, be selected from the group comprising cellulose, cellulose butyrate acetate, alkylds, phenolic binders, polyester binders (such as polycaprolactone or polyethylene terephthalate), vinyl-polymers (such as polybutadiene, polystyrene, polyvinyl chloride, polyvinyl alcohol, polyacrylonitrile, styrene-butadiene-acrylonitrile, polyethyelene or polypropylene), polyurethane binders, epoxy-type binders, polycarbonate binders, acrylics (such as PMMA), polyamides, linear hydrocarbons having 20 or more carbon atoms, aromatic alkanes, glycols (such as PEG 1000), polylactic acids or polyimides. The liquid, optionally multi-component, binding agents may, for example, be selected from the group comprising alkylds (with possible addition of cobalt-derived catalysts for adjustment of reticulation speed), phenolics (with possible addition of catalysts), polyesters (with possible addition of catalysts), polyurethanes (polyisocianate reticulating due to the presence of moisture, or reticulating due to the addition of a second liquid component such as polyol and presence of a catalysts such as amine) or epoxy (reticulating due to the presence of a second liquid component such as amine). Alternative binding agents are calcium aluminate cement, polysaccharides, alkaline earth metal oxides and hydroxides, silica, cellulose and derivatives thereof, starch, polycarboxylates, magnesium or sodium lignosulfonate, magnesium salts such as magnesium sulphate, and mixtures thereof.

Particularly preferred binding agents for use in the present invention are alkylds, linear hydrocarbons having 20 or more carbon atoms, glycols, such as PEG 1000, phenolic binders and epoxy binders.

The particulate composition of the present invention may further comprise fine mineraliser particles as part of the coatings. These mineralisers are intended to speed up the spinel formation during sintering of the compacted DVM mixture after installation and/or to reduce the required sintering temperature thereof. Suitable mineralisers are known to the skilled person and may be selected from the group consisting of $B_2O_3$, $V_2O_5$, $TiO_2$, $Y_2O_3$, $Fe_2O_3$, CaO, NaCl, $AlCl_3$, MgCl, LiF, $ZnF_2$, $BaF_2$, $CaF_2$.

The coated particles comprised in the particulate compositions according to the present invention can be produced as follows:

The general concept is based on the agglomeration of the finer particles aimed to form the coating around the larger particles to be coated, using a liquid binder. The liquid binder will solidify during the coating process, permanently maintaining the fine particles coated around the larger particles to make them attrition resistant. It is thus important that the binder is liquid at the beginning of the mixing process and solid at the end of the mixing process.

In the case that thermoplastic polymers or thermohardening (thermosetting) polymers are used as the binder, the conversion from liquid to solid is achieved by cooling down, below melting temperature or transition temperature of the binder, during mixing. In the case that reacting binder components are used (two-component binding agent), the conversion from liquid to solid is achieved by polymerization reaction of the binder components.

According to one possibility, particles to be coated are introduced into a mixer permitting homogeneous mixing of particles of 0.5 to 15 mm, followed by heating, addition of the binding agent, addition of the particles to form part of the coating of the finished coated particles, and gradual cooling down during mixing. Alternatively, the particles to be coated and/or the binding agent may be pre-heated upon introduction into the mixer and no additional heating is provided during the mixing such that the mixture cools down naturally. The mixing is continued until hardening of the binding agent, due to temperature drop into the mixer, and the coated particles are obtained.

According to one possibility, particles to be coated are introduced into a mixer permitting homogeneous mixing of particles of 0.5 to 15 mm, followed by addition of the first component of a two-component binding agent (or one or several components of a multi-component binding agent). Mixing is started, then the particles to form part of the coating of the finished coated particles are added during mixing, together with the second component of the two-component binding agent (or all remaining components of a multi-component binding agent). The mixing is continued until hardening of the binding agent, due to reaction of the components, and the coated particles are obtained The coated particles thus obtained also form part of the present invention.

In the production of the finished DVM product, particles having the required nature (uncoated $Al_2O_3$/MgO, coated $Al_2O_3$/MgO) and particle sizes are combined. Furthermore, when the particulate compositions according to the present invention are used in the formation of the finished DVM product, further additives may be included. These further additives may be mineraliser particles, selected from the group consisting of $B_2O_3$, $V_2O_5$, $TiO_2$, $Y_2O_3$, $Fe_2O_3$, CaO, NaCl, $AlCl_3$, MgCl, LiF, $ZnF_2$, $BaF_2$, $CaF_2$ may be added to the particulate composition. Also as further additives may be included drying agents, having a high affinity for moisture, such as for example anhydrous magnesium sulphate ($MgSO_4$), boron oxide ($B_2O_3$), amorphous silica gel ($SiO_2$), xanthan gum, acrylic or metacrylic acids. Also as further additives may be included a further binding agent, present in the DVM as free particles. In this embodiment, the further binding agents do not form part of the coatings on the particles in the DVM, and are aimed at increasing the mechanical strength of the compacted DVM, prior to sintering. The further binding agents may be of the same nature as the binding agents used for the formation of the particulate coatings in the particulate compositions according to the present invention. The further binding agents may also be selected from $B_2O_3$, boric acid $B(OH)_3$, or phosphate mixtures.

In an alternative method of formation of the particulate compositions according to the present invention, the particles to form part of the coating are pre-mixed with the binder in an aqueous suspension. In this case, the particles to be coated are introduced into a mixer and the mixing operation is started. A water-based suspension is prepared, comprising from 50 to 89.9 wt.-% particles to form part of a coating, ie. $Al_2O_3$ and/or MgO, from 0.1 to 5 wt.-% of a binding agent and from 10 to 50 wt.-% water. This suspension is added to the mixer and during mixing, the temperature in the mixer is gradually reduced. In this embodiment, a water-soluble or water-dispersable binding agent is required, which may be selected from the group consisting of calcium aluminate cement, polysaccharides, alkaline earth metal oxides and hydroxides, silica, cellulose and derivatives thereof, starch, polycarboxylates, magnesium or sodium lignosulfonate, magnesium salts such as magnesium sulphate, and mixtures thereof. In one embodiment, the temperature in the mixer prior to the addition of the water-based suspension may be between 150° C. and 500° C. Alternatively, the temperature in the mixer may be heated to between 150° C. and 500° C. after introduction of the water-based suspension. In a further embodiment, the temperature in the mixer may be gradually reduced to a temperature below 100° C. after addition of the water-based suspension.

Finally, the present invention allows to provide alumina-magnesia forming DVMs having a higher MgO content than state of the art formulations, therefore allowing stoechiometric or near-stoechiometric ratio of components in the DVM which gives improved spinel formation in the finished sintered monolithic refractory product.

EXAMPLES

Three particulate compositions for use in alumina-magnesia spinel forming dry vibratable mixtures according to the present invention were prepared and compared to a state of the art mixture. The compositions were prepared by mixing together components as shown in Table I, in order to obtain compositions according to the invention (Examples 1, 2 and 3) and two conventional composition (Comparative Examples 1 and 2):

TABLE I

| Example No. | 1 | 2 | Comp. 1 | 3 | Comp. 2 |
|---|---|---|---|---|---|
| WFA (3 to 6 mm) | 12 | 0 | 12 | 7 | 7 |
| WFA (1 to 3 mm) | 0 | 0 | 35 | 30 | 30 |
| WFA (0.5 to 1 mm) | 15 | 15 | 15 | 10 | 10 |
| WFA (≤0.5 mm) | 0 | 0 | 16 | 16 | 16 |
| WFA (≤0.045 mm) | 23 | 23 | 7 | 17 | 17 |
| MgO (3 to 6 mm) | | | | | 5 |
| MgO (1 to 3 mm) | | | | | 5 |
| MgO (0.5 to 1 mm) | | | | | 5 |
| MgO (≤0.5 mm) | 15 | 15 | 0 | | |
| MgO (≤0.045 mm) | 0 | 0 | 15 | 5 | 5 |
| MgO-coated WFA (3 to 6 mm) | 0 | 12 | 0 | | |

TABLE I-continued

| Example No. | 1 | 2 | Comp. 1 | 3 | Comp. 2 |
|---|---|---|---|---|---|
| MgO-coated WFA (1 to 3 mm) | 35 | 35 | 0 | | |
| Al$_2$O$_3$-coated MgO (3 to 6 mm) | | | | 5 | |
| Al$_2$O$_3$-coated MgO (1 to 3 mm) | | | | 5 | |
| Al$_2$O$_3$-coated MgO (0.5 to 1 mm) | | | | 5 | |
| Total | 100 | 100 | 100 | 100 | 100 |
| Total MgO | 21.72 | 24.02 | 15 | 16.43 | 20 |
| Total Al$_2$O$_3$ | 76.95 | 74.19 | 85 | 82.85 | 80 |
| Total binding agent | 1.33 | 1.79 | 0 | 0.72 | 0 |

All the values are given in wt.-% of the total composition

The MgO-coated Al$_2$O$_3$-particles of Examples 1 and 2 were obtained as follows. 40 kg Al$_2$O$_3$ (white fused alumina; particle size distribution=1 to 6 mm, d$_{50}$=3 mm; obtained from Treibacher Schleifmittel) were introduced into a heating mixer of type Eirich R08VAC. The mixing was started, at heating to 120° C., and binding agent (1.97 kg polyethylene glycol obtained from Aldrich Chemicals) was added during mixing. The mixing continued at constant temperature until all of the binding agent was molten. Next, 9.97 kg MgO (sea water dead burned magnesia nedMag 99® having a particle size of 0 to 0.045 mm) was added during constant mixing. The mixing was maintained after the heating was shut down until the contents reached a temperature of 30° C., giving magnesia coated alumina grains. The obtained MgO-coated alumina particles finally comprised 77 wt.-% alumina, 19.2 wt.-% MgO and 3.8 wt.-% binding agent.

The Al$_2$O$_3$-coated MgO-particles of Example 3 were obtained as follows. 40 kg MgO (sea water dead burned magnesia nedMag 99® having a particle size of 1 to 6 mm, d$_{50}$=3 mm) were introduced into a heating mixer of type Eirich R08VAC. The mixing was started, at heating to 120° C., and binding agent (2.52 kg polyethylene glycol from Aldrich Chemicals) was added during mixing. The mixing continued at constant temperature until all of the binding agent was molten. Next, 9.97 kg Al$_2$O$_3$ (white fused alumina having a particle size of 0 to 0.045 mm, obtained from Treibacher Schleifmittel) was added during constant mixing. The mixing was maintained after the heating was shut down until the contents reached a temperature of 30° C., giving alumina coated magnesia grains. The obtained alumina-coated MgO-particles finally comprised 76.2 wt.-% magnesia, 19.0 wt.-% alumina and 4.8 wt.-% binding agent.

It should be noted that the formulation according to Comparative Example 2 does not represent a realistic choice, in view of the deficiencies of DVM compositions obtained from formulations comprising coarse MgO.

The formulations thus obtained were used as DVMs. DVM compacted samples were prepared according to the method described in EN 1402 part 5, paragraph 6 "preparation of test pieces from ramming materials", where liquid addition to DVM was 2% of liquid paraffin prior to compaction using a sand rammer". The compacted samples thus obtained were then tested. The results of these test are shown in Table II:

TABLE II

| Example No. | 1 | 2 | Comp. 1 | 3 | Comp. 2 |
|---|---|---|---|---|---|
| Compaction speed (s) | 42 | 43 | 48 | 42 | 47 |
| Intergranular porosity (%) | 21 | 20.5 | 20 | 20.6 | 20 |
| Unreacted MgO (wt.-%) | 12 | 13 | 9 | 9 | 14 |
| Al$_2$O$_3$-MgO spinel (wt.-%) | 40 | 48 | 20 | 40 | 21 |
| Hydrated magnesia in DVM (wt.-%) | 0.2 | 0,3 | 1.5 | 0.3 | 0.7 |
| Ratio of MgO initially present undergoing hydration (wt.-%) | 1 | 1 | 10 | 1.5 | 3.5 |
| Level of cracks observed | None | None | None | medium | V. high |
| Maximum thickness of worn-out refractory lining (mm) | 15 | 13 | 23 | 19 | 29 |
| Worn-out lining surface (mm$^2$) | 667 | 632 | 1049 | 882 | 1432 |

The various properties of the finished DVM and monolithic lining were measured as follows:

Compaction speed (s): vibrating time required to achieve 80% of final apparent density measured after 5 minutes compaction.

Intergranular porosity (%): was obtained by vibrating the DVMs for 5 minutes (constant amplitude of 0.5 mm, frequency of 50 Hz and direction of vibration) and measuring the apparent density of the compacted DVMs. Intergranular porosity was then calculated by comparing the apparent density of the DVMs to the bulk density of the individual raw materials.

Unreacted MgO (%) and Al$_2$O$_3$—MgO spinel (%) were assessed by means of X-ray diffraction analysis of the compacted DVMs after having been fired for 5 hours at 1500° C.

Hydrated magnesia in DVM (wt.-%) was assessed by calculation after measurement of moisture (weight loss after drying at 150° C. for 24 hours), then loss on ignition (weight loss after 1050° C. for 10 hours) of 200 g to 220 g of uncompacted DVM samples having been preliminarily submitted to following conditions: 48 hours at 60° C./90% relative humidity. From this, the ratio of hydrated MgO compared to originally present MgO was calculated.

The level of cracks was assessed as follows: Compacted DVM samples were fired for 5 hours at 1500° C. in air atmosphere, according to the following heating schedule: room temperature to 1500° C. heating rate of 100° C./hour; dwell time at 1500° C. for 5 hours, cooling down to room temperature by natural cooling rate of the furnace (approx. 24 hours). This thermal treatment leaves the compacted DVM sample to expand freely. This means that the compacted DVM can thermally expand and shrink and also expand permanently due to spinel formation. When the DVM is installed in a furnace as a lining, it cannot expand freely, since it is in a geometrically constrained environment. The level of cracking of the samples is visually assessed and reported according following criteria: "none": no cracks can be visually observed on samples; "medium": some cracks can be visually observed on sample, but sample remains in one single piece; "high": cracks are visible, and some pieces of original samples have detached from it; "very high": sample is totally destroyed and has broken down into several pieces Maximal thickness of worn out refractory lining (mm) and worn-out lining surface (mm$^2$): DVMs were used for lining a small scaled coreless induction furnace (capacity 15 kg) operating at 5 to 50 kHz and 10 to 25 kW for 10 hours at an average temperature of 1650° C., and melting steel and slag. The initial thickness of installed lining was 50 mm.

Steel and slag were removed and replaced four times in two-hour intervals. After cooling down, the refractory lining was cut perpendicular to the heated (internal) surface, and the maximal thickness of the lost (worn out) lining was measured, as well as the global surface of worn out area.

The results shown in Table II display marked improvements in all the assessed parameters.

The invention claimed is:

1. A particulate composition for use in an alumina-magnesia spinel forming dry vibratable mix, the composition comprising, based on the total weight of the particulate composition:
   from 95 to 99.9 wt % of a mixture of particulate $Al_2O_3$ and particulate MgO; and
   from 0.1 to 5 wt % binding agent,
   wherein at least a portion of the particles of said mixture of particulate $Al_2O_3$ and particulate MgO is present in the particulate composition as a coating of particles on the surface of other particles,
   further comprising mineraliser particles as part of said coating, said mineraliser particles selected from the group consisting of $B_2O_3$, $V_2O_5$, $TiO_2$, $Y_2O_3$, $Fe_2O_3$, CaO, NaCl, $AlCl_3$, $MgCl$, LiF, $ZnF_2$, $BaF_2$, and $CaF_2$.

2. The particulate composition of claim 1, wherein the particulate composition has the following particle size distribution:
   from 35 to 65 wt % of the particulate composition are particles having a particle size of 1 mm or above;
   from 45 to 75 wt % of the particulate composition are particles having a particle size of 0.5 mm or above;
   from 65 to 95 wt % of the particulate composition are particles having a particle size of 0.045 mm or above; and
   binding agent,
   wherein at least a portion of the particulate composition are first metal oxide particles selected from $Al_2O_3$, MgO, or both, and having a particle diameter of 0.25 mm or below, which are present in the particulate composition as part of a coating on second metal oxide particles selected from $Al_2O_3$ and MgO and having a particle diameter of 0.5 mm or above.

3. The particulate composition of claim 1, wherein substantially all of the particles present as part of the coating of metal oxide particles on the surface of other particles have a particle diameter of 0.25 mm or below and the other particles have a particle diameter of 0.5 mm or above.

4. The particulate composition of claim 2, wherein some or all of said particles having a particle size of 0.25 mm or below are particles having a particle diameter of 0.045 mm or below.

5. The particulate composition of claim 2, wherein said first metal oxide particles are $Al_2O_3$ or a mixture of $Al_2O_3$ and MgO, and said second metal oxide particles are MgO.

6. The particulate composition of claim 2, wherein said first metal oxide particles are MgO or a mixture of MgO and $Al_2O_3$, and said second metal oxide particles are $Al_2O_3$.

7. The particulate composition of claim 1, wherein the binding agent is selected from solid thermoplastic binding agents, thermohardening binding agents and liquid, thermo setting binding agents and liquid, and reacting binding agents.

8. A particulate composition for use in an alumina-magnesia spinel forming dry vibratable mix, the composition comprising, based on the total weight of the particulate composition:
   from 95 to 99.9 wt % of a mixture of particulate $Al_2O_3$ and particulate MgO; and
   from 0.1 to 5 wt % binding agent,
   wherein at least a portion of the particles of said mixture of particulate $Al_2O_3$ and particulate MgO is present in the particulate composition as a coating of particles on the surface of other particles,
   wherein the $Al_2O_3$ comprises white fused alumina.

9. A method of producing the particulate composition of claim 1, the method comprising the steps of, in order:
   (i) providing (a) from 95 to 99 parts by weight of a mixture of particulate $Al_2O_3$ and particulate MgO, and (b) from 1 to 5 parts by weight of a thermoplastic or thermosetting binding agent;
   (ii) introducing particles from a portion of the provided mixture of particulate $Al_2O_3$ and particulate MgO to be coated into a mixer;
   (iii) starting the mixing operation;
   (iv) introducing the provided binding agent into the mixer;
   (v) introducing particles from another portion of the provided mixture of particulate $Al_2O_3$ and particulate MgO to form part of a coating into the mixer; and
   (vi) gradually reducing temperature in the mixer to below the melting or transition temperature of the thermoplastic or thermosetting binding agent,
   wherein, prior to step (vi) the mixing was carried out at a temperature above the said melting or transition temperature.

10. A method of producing the particulate composition of claim 1, the comprising the steps of, in order:
    (i) providing (a) from 95 to 99.9 parts by weight of a mixture of particulate $Al_2O_3$ and particulate MgO, and (b) from 0.1 to 5 parts by weight of a thermoplastic or thermosetting two-component binding agent;
    (ii) introducing particles from a portion of the provided mixture of particulate $Al_2O_3$ and particulate MgO to be coated into a mixer;
    (iii) starting the mixing operation;
    (iv) introducing a first component of the two-component binding agent into the mixer;
    (v) introducing particles from another portion of the provided mixture of particulate $Al_2O_3$ and particulate MgO to form part of a coating into the mixer; and
    (vi) introducing a second component of said two-component binding agent into the mixer.

11. A method of producing the particulate composition of claim 1, the method comprising the steps of, in order:
    (i) providing (a) a mixture of particulate $Al_2O_3$ and particulate MgO, and (b) a water-based suspension comprising from 50 to 89.9 wt % particles to form part of a coating, from 0.1 to 5 wt % of a binding agent and from 10 to 50 wt % water;
    (ii) introducing particles from a portion of the provided mixture of particulate $Al_2O_3$ and particulate MgO to be coated into a mixer;
    (iii) starting the mixing operation;
    (iv) introducing the water-based suspension into the mixer; and
    (v) gradually reducing the temperature in the mixer to below 100° C.

12. The method according to claim 9, wherein:
    from 35 to 65 wt % of the total provided particulate composition are particles having a particle size of 1 mm or above;
    from 45 to 75 wt % of the total provided particulate composition are particles having a particle size of 0.5 mm or above;

from 65 to 95 wt % of the total provided particulate composition are particles having a particle size of 0.045 mm or above; and such that at least a portion of the particulate composition formed are first metal oxide particles selected from $Al_2O_3$, MgO, or both, and having a particle diameter of 0.25 mm or below, which are present in the particulate composition as part of a coating on second metal oxide particles selected from $Al_2O_3$ and MgO and having a particle diameter of 0.5 mm or above.

13. The method of claim 12, wherein said first metal oxide particles are $Al_2O_3$, and said second metal oxide particles are MgO.

14. The method of claim 12, wherein said first metal oxide particles are MgO, and said second metal oxide particles are $Al_2O_3$.

15. The particulate composition of claim 8, wherein the particulate composition has the following particle size distribution:

from 35 to 65 wt % of the particulate composition are particles having a particle size of 1 mm or above;

from 45 to 75 wt % of the particulate composition are particles having a particle size of 0.5 mm or above;

from 65 to 95 wt % of the particulate composition are particles having a particle size of 0.045 mm or above; and binding agent, wherein at least a portion of the particulate composition are first metal oxide particles selected from $Al_2O_3$, MgO, or both, and having a particle diameter of 0.25 mm or below, which are present in the particulate composition as part of a coating on second metal oxide particles selected from $Al_2O_3$ and MgO and having a particle diameter of 0.5 mm or above.

16. The particulate composition of claim 8, wherein substantially all of the particles present as part of the coating of metal oxide particles on the surface of other particles have a particle diameter of 0.25 mm or below and the other particles have a particle diameter of 0.5 mm or above.

17. The particulate composition of claim 15, wherein some or all of said particles having a particle size of 0.25 mm or below are particles having a particle diameter of 0.045 mm or below.

18. The particulate composition of claim 15, wherein said first metal oxide particles are MgO or a mixture of MgO and $Al_2O_3$, and said second metal oxide particles are $Al_2O_3$.

19. The particulate composition of claim 8, wherein the binding agent is selected from solid thermoplastic binding agents, thermohardening binding agents and liquid, thermo setting binding agents and liquid, and reacting binding agents.

* * * * *